United States Patent [19]

Simon et al.

[11] Patent Number: 5,167,822
[45] Date of Patent: * Dec. 1, 1992

[54] BUTADIENE ACRYLONITRILE POLYMERIC COATING FOR CHROMATOGRAPHIC PACKING MATERIAL

[75] Inventors: Ethan S. Simon; Kevin Holland; Christopher McClanahan, all of Charlottesville, Va.

[73] Assignee: Biotage Inc., Charlottesville, Va.

[*] Notice: The portion of the term of this patent subsequent to Dec. 1, 2009 has been disclaimed.

[21] Appl. No.: 664,366

[22] Filed: Mar. 4, 1991

[51] Int. Cl.⁵ .............................................. B01D 15/08
[52] U.S. Cl. ................................... 210/635; 210/656; 210/198.2; 210/502.1; 502/402; 502/157
[58] Field of Search ................ 210/656, 198.2, 502.1, 210/635

[56] References Cited

U.S. PATENT DOCUMENTS

| | | | |
|---|---|---|---|
| 4,045,353 | 8/1977 | Kosaka | 210/502 |
| 4,675,384 | 6/1987 | Dromard et al. | 210/263 |
| 4,786,628 | 11/1988 | Wieserman | 502/401 |
| 4,822,593 | 4/1989 | Wilhelma | 423/629 |
| 4,913,935 | 4/1990 | Lin | 427/221 |

Primary Examiner—Patrick P. Garvin
Assistant Examiner—B. Peebles
Attorney, Agent, or Firm—Sheldon H. Parker

[57] ABSTRACT

A method of separating organic materials is disclosed utilizing a chromatographic packing material. This packing material includes a coated support material which is a chromatographically suitable substrate. An immobilized butadiene acrylonitrile polymer coating is provided on the substrate. The copolymer can be crosslinked by gamma radiation, or by means of a crosslinking agent such as dicumyl peroxide. The support material can be silica, alumina, diatomaceous earth, zeolite, porous glass or carbon, but preferably is spherical lamellar shaped crystals of aluminum hydroxide. The aluminum hydroxide crystals are bonded together at a central core and extend radially outward from a central core with a particle density ranging from 0.3 to 2.5 g/cm³ and a diameter of 2 to 150 microns.

15 Claims, 3 Drawing Sheets ically sized polymers consisting of butadiene, methylbutadiene, ethylbutadiene, or higher alkyl derivatives and copolymers thereof. A preferred hydrocarbonaceous polymer is butadiene acrylonitrile copolymer. The term "copolymer" as used herein refers to a polymer derived from two or more monomers, that is, it includes terpolymers and higher polymers.

BUTADIENE ACRYLONITRILE POLYMERIC COATING FOR CHROMATOGRAPHIC PACKING MATERIAL

BACKGROUND OF THE INVENTION

Cross Reference to Related Applications

This application is related to copending patent application Ser. No. 664,344, filed Mar. 4, 1991, entitled Chromatographic Packing Material For Chromatographic Packing Material, and having common assignee and common inventorship.

Field of the Invention

This invention relates to the immobilization of hydrocarbonaceous polymers on inorganic support materials for subsequent use as chromatographic stationary phases. More specifically, this invention relates to the coating of a polymer onto a metal oxide followed by in situ crosslinking of the polymer thereby producing stationary phases that exhibit unique chromatographic selectivities and excellent pH and chemical stability.

Prior Art

Chemically modified silica supports are currently the most widely used stationary phases for reversed-phase liquid chromatography. However, these alkyl-bonded silica-based materials suffer from two major limitations: first, residual silanol groups frequently have adverse effects on chromatographic performance, and second, silica-based materials are stable only over a pH range of 2–8.5. In particular, of the various commercially available silica-based stationary phases, cyano bonded phases are considered to be the least rugged. Polymeric supports exhibit enhanced pH stability but are often limited by their lack of structural rigidity and low efficiencies due to the poor diffusional properties of solutes in these materials.

As a result of the aforementioned difficulties, attention has been given to an approach that involves the deposition of a hydrophobic, chemically stable polymer onto the surface of an inorganic carrier followed by a radical-initiated cross-linking reaction which serves to immobilize a thin layer of polymer on the surface of the support. This general approach has been taken by various researchers (e.g. Schomburg, Regnier, etc.) but, to date, no material has been reported which exhibits the combination of acid and base stability, high efficiency and good chromatographic selectivities, especially for macrocyclic antiobiotics. Macrocyclic antibiotics, such as erythromycin are widely used and improved methods for their analysis and separation are highly desirable for macrocyclic antibiotics.

SUMMARY OF THE INVENTION

In accordance with the present invention, chromatographic stationary phases are provided which consist of a thin layer of crosslinked polymer on an inorganic support. These materials are shown to overcome many of the disadvantages associated with chemically bonded metal oxides and polymeric materials. The composites herein described exhibit a high degree of pH and chemical stability while providing a surface chemistry that is ideally suited for the separation of classes of compounds such as antibiotics and complex carbohydrates.

The process for preparing such chromatographic stationary phases can involve the in situ chemical modification of the coated/crosslinked polymer in order to produce a surface chemistry that is tailored to a particular chromatographic separation.

The chromatographic packing material includes a coated support material. The coated support material is a chromatographically suitable substrate, having a uniform immobilized coating. The coating is a butadiene acrylonitrile copolymer. The packing material is preferably employed in reversed-phase chromatography.

The copolymer is crosslinked, preferably through gamma radiation, or through the use of a photoinitiator or thermally. The copolymer can contain a thermal initiator, as for example dicumyl peroxide.

The support material can be any of the particles used for this purpose, as well known in the art, as for example, silica, alumina, diatomaceous earth, zeolite or porous glass. The preferred support material is aluminum hydroxide particles. The aluminum hydroxide particles are preferably spherical lamellar shaped crystals. The crystals are preferably bonded together at a central core and extend radially outwardly from a central core. The particle density can range from 0.3 to 2.5 g/cm$^3$, and the particle diameter can be in the range from 2 to 150 microns.

The copolymer can be derived from a liquid copolymer which contains pendent reactive groups and can be carboxyl terminated. The carboxyl terminated copolymers may be considered to be long chain dicarboxlyic acids having functionalities between about 1.8 and 2.4. The copolymer can be derived from a liquid copolymer which is vinyl terminated and have reactive acrylate vinyl groups. Preferably the copolymer is predominantly butadiene, with the butadiene to acrylonitrile ratio being on the order of 5 to 1. The ratio, however can be from about 1:1 to about 10:1.

DESCRIPTION OF THE PREFERRED EMBODIMENTS

Figure 1:
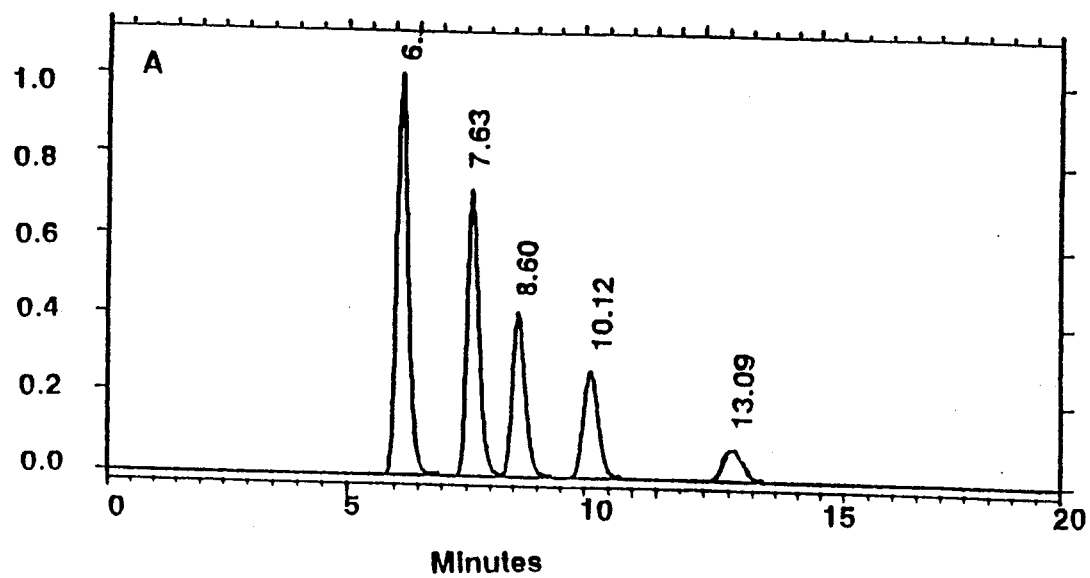
FIG. 1 shows chromatograms obtained before and after exposure to pH 10.5 mobile phase.
Figure 1:
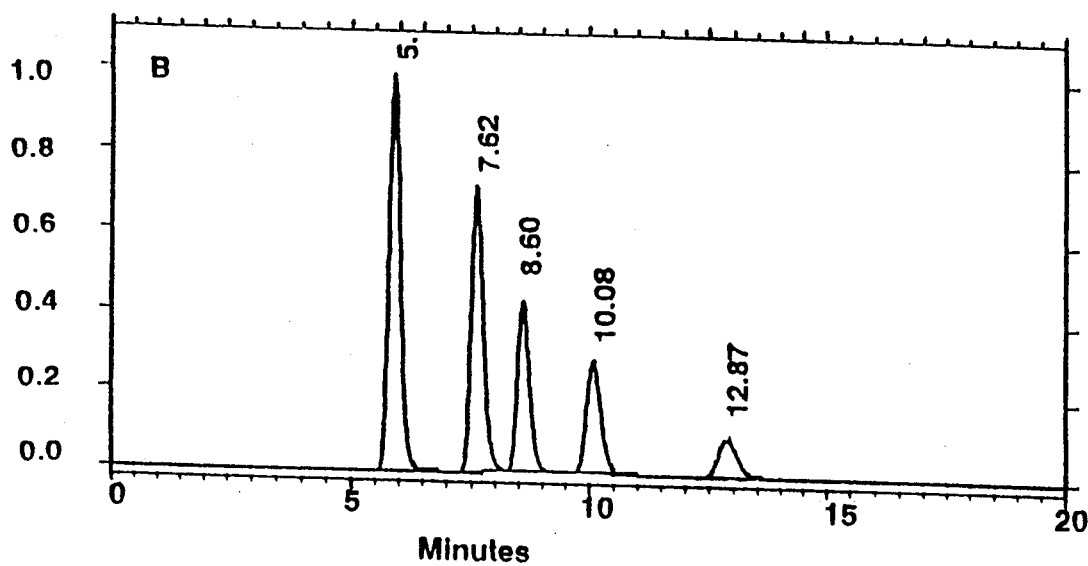
Figure 2:
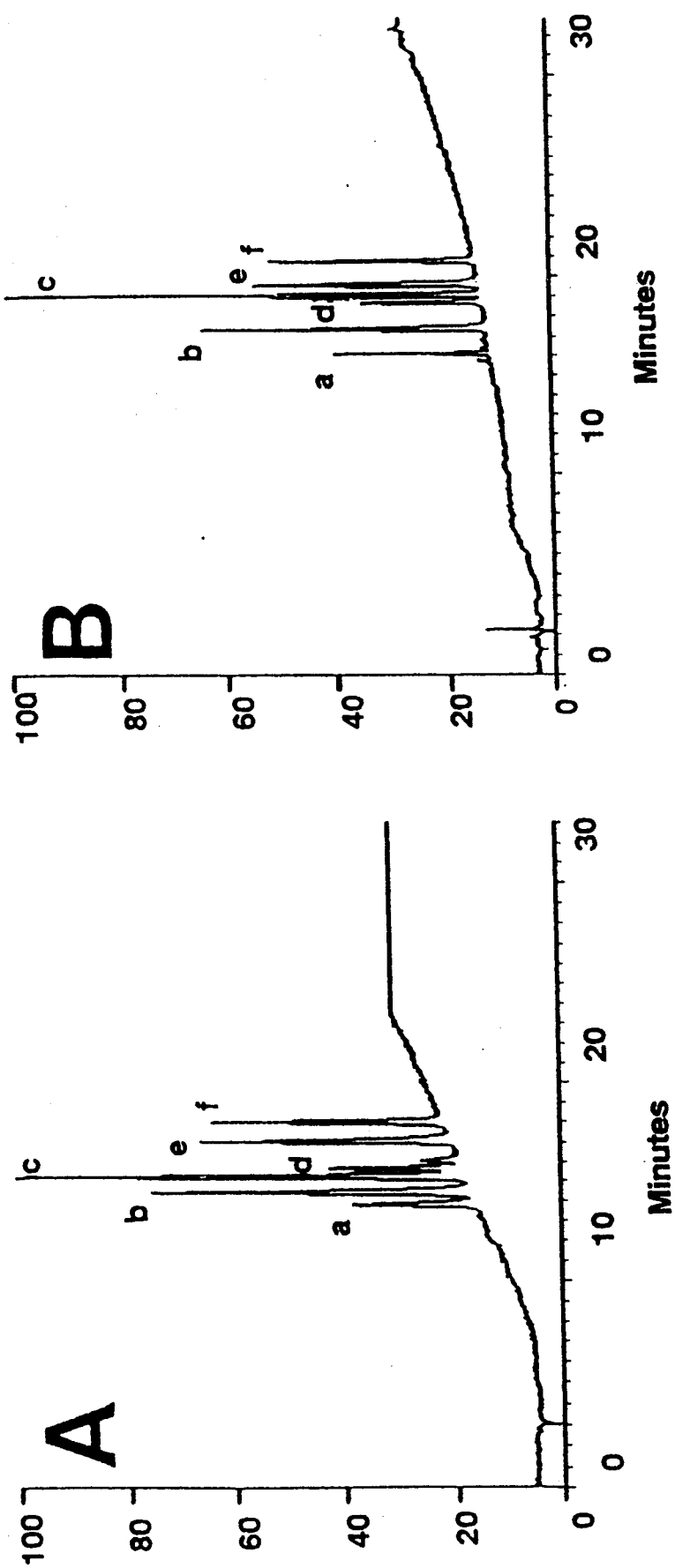
FIG. 2 shows the separation of several macrolide antibiotics at pH 11.0.

The chromatographic stationary phases comprise an inorganic carrier onto which has been coated and crosslinked a layer of organic polymer. The inorganic carriers that may be used in the present invention include, but are not necessarily limited to silica, silica gels, glass, carbon bentonite, hydroxyapatite, zirconia, titania and alumina. The preferred carrier is alumina having a known average pore size, known particle size and known surface area. The primary requirement for the inorganic carriers is that they be essentially water insoluble and have sufficient surface area (>5 m$^2$/g) for the coating of a sufficient amount of a sufficient amount of thin polymeric film.

Further details of carrier materials are found in the prior art, as for example U.S. Pat. Nos. 4,786,628, 4,822,593, and 4,045,353, and the disclosures of which are incorporated herein by reference or in the book, "Packing and Stationary Phases in Chromatographic Techniques" edited by K. K. Unger (Marcel Dekker, 1990).

The organic polymers employed in the present invention include, but are not necessarily limited to the range of Hycar Reactive Liquid Polymers available from B. F. Goodrich, Inc. (e.g. Hycar 1300X40, Hycar 1300X43, etc.). The primary practical requirements for the polymers are that they be easily solubilized to facilitate the coating process and that they possess chemical functionalities which allow crosslinking and/or chemical grafting reactions.

In order to produce the stationary phases described here, a solution is prepared containing typically 5-50% (w/w relative to the weight of support being used) of polymer in a suitable solvent (e.g. tetrahydrofuran, ethyl acetate). To the solution is also added any necessary radical initiators or stabilizers at a level of 0-13% w/w. Inorganic carrier, such as alumina, is added to the solution in a round-bottomed flask and shaken for several minutes. The solvent is then removed by evaporation at reduced pressure using a rotary evaporator until the material is free-flowing.

The polymer-coated support is then subjected to a crosslinking reaction using a free radical initiator (e.g. dicumyl peroxide) at elevated temperatures or by use of gamma irradiation from a $^{60}$Co source. After crosslinking, the materials are typically washed with 1% glacial acetic in hexane or ethyl acetate followed by a wash with hexane. The washed material is then dried and packed into columns. Specific details for particular stationary phases are included in Examples 1-7 below.

The following examples are given to illustrate the invention.

EXAMPLE 1

This example describes a process for coating of alumina with poly(butadiene-acrylonitrile) by irradiation.

Poly(butadiene-acrylonitrile) (25 g, Hycar VTBNX (1300X43), B. F. Goodrich Co., Cleveland, Ohio) and dicumyl peroxide (2.5 g, Polysciences, Inc., Warrington, Pa.) were dissolved in 500 mL of ethyl acetate. Sonication aided the dissolution of the polymer. The slightly cloudy solution was added to a 1-L round-bottomed flask containing 250 g of alumina powder (8 micron Unisphere ® alumina, Biotage, Inc., Charlottesville, Va.) and the suspension was shaken for 15 min. Removal of solvent by rotary evaporation at reduced pressure yielded a free-flowing powder.

The flask containing the coated powder was placed near a $^{60}$Co array for 24 h. at a dosage rate of $2 \times 10^5$ Rad/h.

Following irradiation, the sample was washed with ~3 mL of a solution of hexane containing 1% of acetic acid per gram of alumina and then with ~3 mL of hexane per gram of alumina. The product was dried either at reduced pressure to give a free-flowing powder which was used to effect a range of separations by high-performance liquid chromatography as described in Examples 2-4.

The ethyl acetate of this example can be replaced by other solvents, such as tetrahydrofuran, methyl ethyl ketone, or aromatic solvents, as well known to those skilled in the art.

In this example, the exact total radiation dosage is not critical. Increasing the total time of irradiation up to 7 days did not affect the subsequent chromatographic performance of the product. Other $^{60}$Co sources could also be used advantageously.

In this example, the solvents used to wash the product can be advantageously replaced by other solvents, such as ethyl acetate, and other solvents suitable for solubilizing poly(butadieneacrylonitrile) or dicumyl peroxide and their degradation products.

It should be understood that additives other than dicumyl peroxide or no additives may be added to affect the crosslinking step. Examples 6 and 8 illustrate that this generalization is possible.

Crosslinking can be achieved by means other than irradiation, such as thermal or photochemical treatment. Example 5 illustrates the use of thermal crosslinking.

EXAMPLE 2

Chromatographic performance of the alumina-based cyano stationary phase.

A 3.5 g quantity of poly(butadiene-acrylonitrile)-coated alumina prepared as in Example 1 above was packed into a 4.6 mm i.d. ×250 mm stainless steel column using methanol at a pressure of 6000 psi. A test mixture consisting of theophylline, p-nitroaniline, methyl benzoate, phenetole, and o-xylene (1 mg/mL each in 50% aqueous acetonitrile) was prepared and injected onto the column. The test mixture components were eluted using a mobile phase of 45% water and 55% acetonitrile at a flow rate of 0.5 mL/min. The efficiency of the column was found to be 35,500 plates/meter with an o-xylene retention of 13.5 minutes. The pH of the water portion of the mobile phase was raised to 10.5 with aqueous ammonia and after operation at this pH for 24 hours the efficiency was found to be 35,200 plates/meter and the o-xylene retention 13.4 minutes. This represents <1% loss of retention and efficiency. These chromatographic measurements showing the high level of performance of the material at high pH are shown in FIGS. 1A and 1B.

EXAMPLE 3

The chromatographic performance of the material described in Example 2 is further illustrated in Figure. This chromatogram shows the separation of a mixture of macrolide antiobiotics and was generated using a mobile phase of 80% 0.02M $KH_2PO_4$ 20% acetonitrile, apparent pH 10.9 and a flow rate of 1.2 mL/min. The samples chromatographed are indicated in the figure caption. After operation for 72 hours at pH 10.9, the measured loss of column efficiency was found to be less than 1%.

EXAMPLE 4

Figure 3:
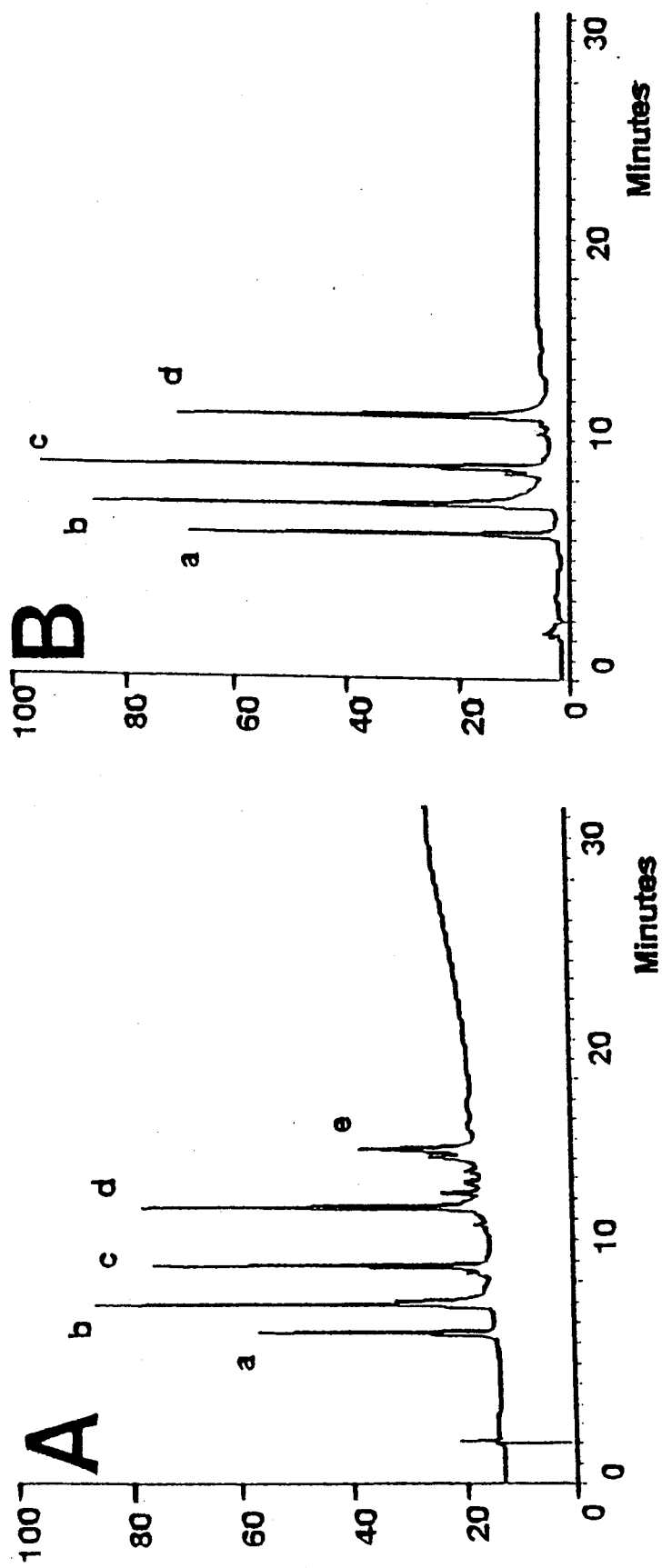
FIG. 3 shows the separation of several penicillin antibiotics at pH 3.0.

The same column as was used in Example 3 was used for the separation of a set of penicillins (Fig. 3) using a mobile phase of 72% 0.015-M phosphate buffer (pH 3.0) and 28% acetonitrile. Thus the invention exhibits good stability over a wide pH range with good separation efficiency.

EXAMPLE 5

This example describes a process for coating of alumina with poly (butadiene-acrylonitrile) by thermal treatment.

1 g of Hycar VTBNX (1300X43) and 0.1 q of dicumyl peroxide were dissolved in 30 mL of ethyl acetate. The resulting solution was added to 10 g of 8 micron Unisphere alumina in a 100-mL round-bottomed flask and the suspension was shaken for 15 min Removal of solvent by rotary evaporation at reduced pressure yielded a free flowing powder.

The powder was heated in an atmosphere of nitrogen at 110° C. for 30 minutes an then at 140° C. for 3 h. The reaction flask was allowed to cool to room temperature under a positive pressure of nitrogen and then washed and used to effect separations following Example 2. The retention time of o-xylene was 11 min. and the efficiency was 17,000 plates/meter. When the same alumina was coated with polybutadiene the retention time of o-xylene was 9.6 min. and the efficiency was 12,000 plates/meter.

EXAMPLE 6

The procedure described in Example 1 was carried out, except the reactants were 0.5 g of poly (butadiene-acrylonitrile),0.5 g of allyl methacrylate and 5 g of alumina. The retention time of o-xylene was 14.1 min, and the efficiency was 25,000 plates/meter. This example showed that dicumyl peroxide may be replaced by other additives.

EXAMPLE 7

A solution of 2.5 g of poly(butadiene-acrylonitrile), 0.25 g of dicumyl peroxide and 0.25 g of divinyl benzene in 175 mL of ethyl acetate was shaken with 25 g of 8 micron alumina powder for 10 min. Following removal of the solvent by rotary evaporation at reduced pressure, the material was irradiated using a $^{60}Co$ source at $1.65 \times 10^6$ Rad/h for 24 hr. The material was washed as follows:

The sample was slurried in 200 mL of ethyl acetate and sonicated for 10 min. The solvent was removed by filtration using a Bchuer funnel. This procedure was repeated and the material was then washed with 150 mL of hexane. The material was packed according to Example 2. The retention time of o-xylene was 16 min. This Example 7 shows that the addition of other crosslinking agents can alter the characteristics of the material by altering retention times.

Hycar is a registered trademark of B. F. Goodrich for butadiene homopolymers and butadiene/acrylonitrile copolymers. The isomer content is largely cis/trans with vinyl (1,2 addition of butadiene) being 25 % or less. They have reactive groups in both terminal positions of the polymer chain and may have additional reactive groups pendent on the chain. Some do not contain solvents or other unreactive components. The designator letter C indicates a carboxyl group, V indicates a vinyl group, A indicates an amine group, T indicates terminal reactive groups, B indicates butadiene, N indicates Acrylonitrile and X indicates the presence of pendent reactive groups. The CT series of carboxyl terminated liquid polymers may be considered long chain dicarboxylyic acids having functionalities between 1.8 and 2.4. The typical properties are as follows:

| Hycar polymer | 1300X8 CTBN | 1300X13 |
|---|---|---|
| acrylonitrile % content | 18 | 26 |
| Carboxyl content | | |
| Acid number | 29 | 32 |
| EPHR | .052 | .057 |
| Brookfield Viscosity mPa · s or cP. 27° | 135,000 | 570,000 |
| Solubility parameter based on molar attraction constants | 8.77 | 9.14 |
| Specific gravity 25°/25° C. | 0.948 | .960 |
| Fuctionality | 1.8 | 1.8 |
| Molecular weight, Mn | 3,600 | 3,200 |

The HYCAR Vinyl terminated (VT) liquid polymers have reactive acrylate vinyl groups and can be reacted into systems involving cures by free radical mechanisms. The reactive vinyl group is separate from the cis/trans/vinyl unsaturation contributed by the polymerized butadiene of the polymer backbone. Typical properties for the methacrylated polymer is as follows:

| Hycar polymer | 1300X43 VTBNX |
|---|---|
| acrylonitrile % bound | 21.5 |
| Acid number | Max. 5 |
| Brookfield Viscosity mPa · s or cP. 27° | 425,000 |
| Specific gravity 25°/25° C. | .981 |
| Solubility Parameter | 9.091 |

What is claimed is:

1. Method of separating organic materials, said method comprising the steps of;
   a) providing a bed of packing material selected from the group consisting of silica and alumina, said packing material having bonded thereto, an immobilized polymeric coating, said coating being a crosslinked butadiene acrylonitrile copolymer,
   b) introducing organic materials to said bed,
   c) adding an eluting fluid to said bed,
   d) removing said fluid and one of said organic materials from said bed, and
   e) separating said material removed in step (d) from the fluid.

2. The method of claim 1, wherein said packing material is spherical aluminum hydroxide particles.

3. The method of claim 2 wherein said support material is spherical lamellar shaped crystals of aluminum hydroxide.

4. The method of claim 3 wherein said aluminum hydroxide crystals are bonded together at a central core and extend radially outwardly from a central core.

5. The method of claim 4, wherein the particle density ranges from 0.3 to 2.5 g/cm$^3$.

6. The method of claim 5, wherein said particles have a diameter of 2 to 150 microns.

7. The method of claim 1, wherein said copolymer is derived from a liquid copolymer which contains carboxyl group.

8. The method of claim 1, wherein said copolymer is derived from a liquid copolymer which contains a vinyl group.

9. The method of claim 1, derived from a liquid copolymer which contains terminal reactive groups.

10. The method of claim 1, wherein said copolymer is derived from a liquid copolymer which contains pendent reactive groups.

11. The method of claim 1, wherein said copolymer is derived from a liquid copolymer which is carboxyl terminated.

12. The method of claim 11 wherein said carboxyl terminated copolymer be considered long chain dicarboxlyic acids having functionalities between about 1.8 and 2.4.

13. The method of claim 1, wherein said copolymer is predominantly butadiene.

14. The method of claim 13, wherein the ratio of butadiene to acrylonitrile is from about 1:1 to about 10:1.

15. The method of claim 1, wherein copolymer is derived from a liquid copolymer which is vinyl terminated and have reactive acrylate vinyl groups.

* * * * *